(12) United States Patent
Shelley et al.

(10) Patent No.: US 6,619,639 B1
(45) Date of Patent: Sep. 16, 2003

(54) LOW FICTION ROTATING BUSHING, PARTICULARLY FOR HEAVY VEHICLE LIFT AXLE

(75) Inventors: Bert C. Shelley, Cuba, MO (US); Keith W. Meyer, Leasburg, MO (US)

(73) Assignee: ATRO Engineered Systems, Inc., Sullivan, MO (US)

( * ) Notice: Subject to any disclaimer, the term of this patent is extended or adjusted under 35 U.S.C. 154(b) by 0 days.

(21) Appl. No.: 10/037,333

(22) Filed: Dec. 21, 2001

(51) Int. Cl.[7] .............................................. B60G 11/22
(52) U.S. Cl. ...................................... 267/292; 267/293
(58) Field of Search ............................ 267/52, 53, 260, 267/261, 292, 293, 276, 281, 141.2

(56) References Cited

U.S. PATENT DOCUMENTS

| | | |
|---|---|---|
| 3,960,389 A | 6/1976 | Narahari |
| 4,000,913 A | 1/1977 | Gibson |
| 4,134,175 A | 1/1979 | Contoyanis |
| 4,293,145 A | 10/1981 | Taylor |
| 4,300,787 A | 11/1981 | VanDenberg |
| 4,573,704 A | 3/1986 | VanDenberg et al. |
| 4,840,395 A | 6/1989 | Sturmon |
| 5,018,593 A | 5/1991 | Hermann |
| 5,286,014 A * | 2/1994 | Chakko ....................... 267/293 |
| 5,505,481 A | 4/1996 | VanDenberg et al. |
| 5,549,322 A | 8/1996 | Hauri |
| 5,820,115 A * | 10/1998 | Stevenson et al. .......... 267/293 |
| 5,902,050 A | 5/1999 | Balczun et al. |
| 5,946,980 A | 9/1999 | Raza et al. |
| 5,988,614 A | 11/1999 | Sturmon |
| 6,082,721 A | 7/2000 | Kingsley |

* cited by examiner

Primary Examiner—Christopher P. Schwartz
(74) Attorney, Agent, or Firm—Polster, Lieder, Woodruff & Lucchesi L.C.

(57) ABSTRACT

A bushing for a lift axle assembly for a heavy vehicle. The lift axle assembly selectively lowers and raises supplemental wheels of the vehicle into and out of engagement with a support surface and forms a part of the support system for the vehicle when the supplemental wheels are lowered. The assembly comprising at least one bushing. The bushing includes a hard polymeric sleeve having a wall thickness of about 0.1" to about 0.3" (0.25–0.76 cm) and a hardness of greater than Shore 65D. An elastomeric polyurethane sleeve surrounds the hard polymeric sleeve and is fixed to it. A metal shaft is rotatably mounted in the hard polymeric sleeve.

28 Claims, 3 Drawing Sheets

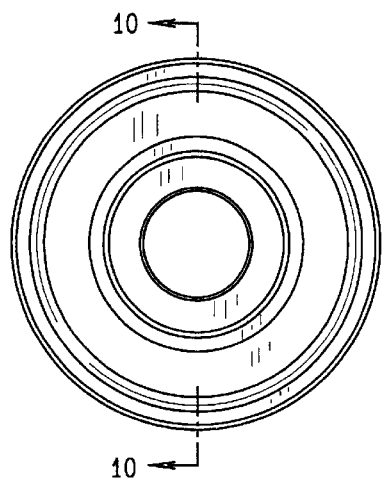 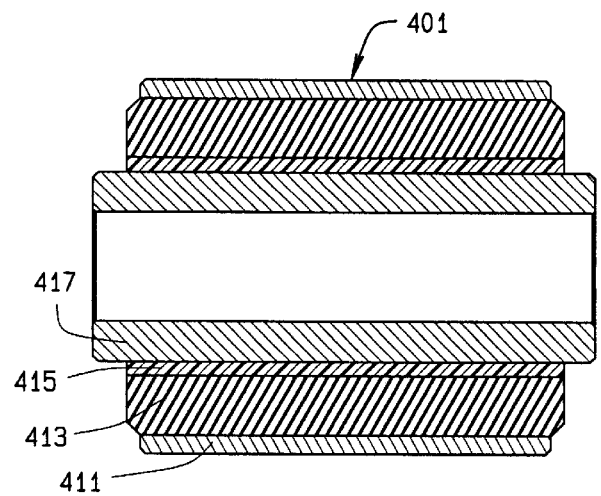
FIG. 9  FIG. 10
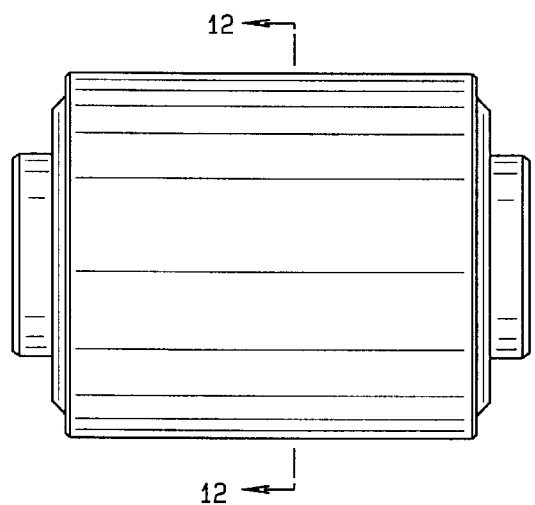 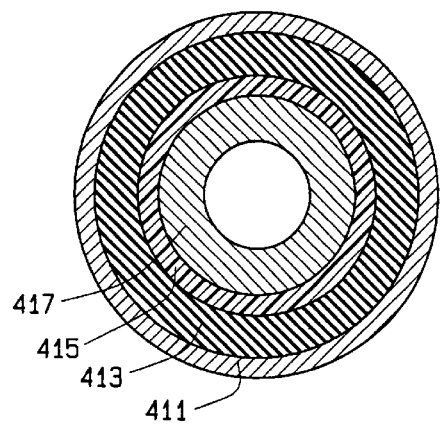
FIG. 11  FIG. 12

LOW FICTION ROTATING BUSHING, PARTICULARLY FOR HEAVY VEHICLE LIFT AXLE

CROSS-REFERENCE TO RELATED APPLICATIONS

Not applicable

STATEMENT REGARDING FEDERALLY SPONSORED RESEARCH OR DEVELOPMENT

Not Applicable.

TECHNICAL FIELD

This invention relates to elastomeric bushings, and in particular to an improved bushing for use in heavy off-road and over-the-road vehicles. The bushings of the present invention are particularly, but not exclusively, useful in replacing rubber and polyurethane bushings in a lift axle suspension system for such heavy vehicles.

BACKGROUND OF THE INVENTION

It is common to provide lift axles for certain heavy hauling vehicles such as dump trucks, refuse haulers, grain trucks, ready-mix cement transit mixers, block haulers, construction vehicles, and other special application vehicles. Such vehicles are adapted for both roadway and off-road operation. The lift axles form a supplemental suspension system for the vehicle and provide additional support for on-road use when the vehicles are heavily laden, to assist in spreading the vehicle weight and to minimize road and bridge damage. An example of such a vehicle is the dump truck shown diagrammatically in FIG. 1. Lift axles are also used on heavy over-the-road tractors and trailers to meet government weight-per-axle limitations when the truck is heavily laden.

Lift axle suspension systems selectively lower and raise the supplemental wheels of a vehicle into and out of engagement with the road or other support surface and form a part of the support system for the vehicle when the supplemental wheels are lowered. The supplemental wheel assemblies are of various constructions, but they generally include an arm mounted to each side of the vehicle frame via one or more pivot connectors. An air bag (also called an air spring or air bellows) is commonly interposed vertically between the arm and the hanger bracket for selectively lowering the axle, wheel, and tire assembly into engagement with the road surface and providing the support for it. Another mechanism such as a second air bellows or a spring is provided for lifting the axle. The lift mechanism may also include a pivot connector. The pivot connectors are generally in the form of elastomeric bushings.

Numerous commercial lift axle suspension systems are available. They include, for example, ReycoGranning Suspensions Models LT80, LT120, T100AT, T300A, LT225, and T350AX, Granning Air Suspensions Models L120, L200, L225, BL100, T200AX, and LT120, Watson & Chalin Models LWSL-1100-SR, SL-1800, WCAL-1300, and AL2200, and Spring Valley Models AB1000, AB1000CL, AB1000AL, AB2250AL, SS120, AB1300AL, AB800CL, and TR225AR. Current commercial air lift axle assemblies have a capacity ranging from about 8,000 pounds to about 25,000 pounds. The assemblies themselves are heavy, weighing on the order of nine hundred to two thousand pounds. Although details of their constructions vary, most have either a single arm and a single bushing on each side of the frame or a two-arm pariallelogram construction having four bushings on each side of the frame.

The patent literature also contains numerous examples of lift axle assemblies, such as Narahari, U.S. Pat. No. 3,960,389, Gibson, U.S. Pat. No. 4,000,913, Taylor, U.S. Pat. No. 4,293,145, Vandenberg, U.S. Pat. No. 4,300,787, VanDenberg et al., U.S. Pat. No. 4,573,704, Hermann, U.S. Pat. No. 5,018,593, VanDenberg et al., U.S. Pat. No. 5,505,481, and Hauri, U.S. Pat. No. 5,549,322.

It has been found that existing elastomeric bushings for lift axle assemblies wear out quickly and thus need frequent replacement. Rubber, non-rotating bushings have been used traditionally. They have too much "wind-up" (built-up tension as they rotate) and do not allow the suspension to cycle through its entire range of motion. The substitution for conventional rubber bushings of rotatable polyurethane bushings like those described in co-assigned patents to Sturmon, U.S. Pat. Nos. 4,840,395 and 5,988,614, has not been an entirely satisfactory solution. These bushings usually require more torque to rotate than the lift axle lift spring can provide to consistently raise the axle.

All of the patents mentioned herein are incorporated by reference.

BRIEF SUMMARY OF THE INVENTION

In accordance with one aspect of the present invention, generally stated, a lift axle assembly is provided for a heavy vehicle for selectively lowering and raising supplemental wheels of the vehicle into and out, of engagement with a support surface, the assembly forming a part of the support system for the vehicle when the supplemental wheels are lowered, the assembly comprising at least one bushing, the bushing comprising a hard sleeve having a hardness of greater than Shore 65D, an elastomeric sleeve surrounding the hard sleeve, and a shaft rotatably mounted in the low friction sleeve. The shaft is typically in the form of a bolt, a solid pin, or a hollow tube. The low friction sleeve has a coefficient of friction lower than the elastomeric sleeve. In a preferred embodiment, the low friction sleeve is a self-supporting tube. In a particularly preferred embodiment the low friction sleeve is made of ultra-high molecular weight polyethylene.

In accordance with another aspect of the inventions, a heavy vehicle having a frame is provided with a moveable arm, and a pivot connecting the moveable arm to the frame, the pivot comprising a bushing having a first part operatively attached to the frame and a second part attached to the arm, the second part being coaxial with the first part, wherein one of the first and second parts comprises a hard polymeric sleeve and an elastomeric sleeve surrounding the hard sleeve, and the other of the first and second parts comprises a metal shaft rotatably mounted in the hard sleeve. The sleeve is preferably self-supporting and made of a hard polymer.

Typically, but not necessarily, the shaft is rigidly connected to the vehicle body and the sleeves are mounted in the rotatable arm. The arm has a substantial angular travel from the assembly's retracted position to its lowered position. In most designs it rotates at least ten degrees but less than fifty degrees, usually on the order of fifteen to thirty degrees. It has been found that the use of the bushing of the present invention greatly reduces the effort required to rotate the lift axle from its road-engaging position to its retracted position. It has been found that as little as ten foot pounds of torque, and typically no more than fifty foot pounds of torque, is required to turn the sleeve with respect to the shaft, even when the bushing is clamped tightly or after long continuous use in the road-engaging position. The bushing also increases bushing life by reducing torque-induced stress on the elastomeric component.

Preferably, the bushing is substantially free of lubricant.

Preferably, and in accordance with one aspect of the invention, the elastomeric sleeve is made of polyurethane. As used herein, except as otherwise indicated, the term "polyurethane" includes polyurethanes, polyureas, and blends thereof. The elastomer preferably has a Shore (durometer) hardness in the range of 65A to 95A. The elastomeric sleeve, for many applications, typically has a hardness of about Shore 85A to 95A. A particularly preferred material has a tensile strength of at least 4,000 psi, a tear (die C) strength of at least 525 pli, a 100% modulus of over 2,500, and an ultimate elongation of at least 100%. An ultimate elongation in the range of 100% to 300% is preferred. Other elastomeric materials may also be used, but are not preferred.

The hard sleeve is made of a material having a much higher Shore hardness, in the range of about 65D or higher. It also has a lower coefficient of friction than the elastomeric sleeve. The preferred material is a polyolefin, such as a polyethylene or a polypropylene; particularly preferred is an ultra-high molecular weight (UHMW) polyethylene having a weight average molecular weight of 3.1 million or greater. Although more expensive, a self-lubricating acetal or a polytetrafluoroethylene sleeve is believed also to be operable in the invention. Although less preferred, other polymers such as hard polyurethane (65D or greater), nylon and phenolic (Garolite) resins may also be workable. For some extreme applications, the hard sleeve may be a metal, such as bronze, although this modification is generally not preferred.

The hard polymeric sleeve is preferably fixed to the elastomeric sleeve. In the preferred embodiments, the elastomeric sleeve is heated sufficiently to adhere to the hard plastic sleeve. The inner sleeve is preferably about 0.1" to 0.5" (0.25–1.27 cm) thick. The outer elastomeric sleeve may be 0.2" to 2.5" (0.5–6.35 cm) thick.

The bushing may optionally include an outer metal shell surrounding the elastomeric sleeve. The elastomeric sleeve may be bonded to the shell, but need not be.

Preferably, the arm is part of a lift-axle assembly carrying a wheel. The lift axle assembly may be either a pusher or a tag configuration. In this environment, the bushing of the present invention has been found to provide remarkable decreases in the forces required to rotate the bushing or shaft and to provide exceptionally long life, while providing vibration dampening, self-alignment, and axial stress relief at least comparable to that of known bushings.

The bushing of the present invention may also be used in other heavy vehicle applications, such as the assemblies used for raising and lowering cement mixer mixing thimbles, and heavy vehicle steering axles. The bushing of the present invention, however, is not believed to be suitable for all uses in heavy vehicles. It will not tolerate large side loads without support, and its direct loading capacity is limited. Therefore, although it is highly suited to uses in which maximum loads on the bushing are on the order of ten thousand pounds, it is not believed to be highly suitable for use in such vehicles for torque rod bushings or center or end bushings, because they may experience loads up to eighty thousand pounds in off-road use.

Polyurethane has been found to be a particularly advantageous elastomer. The hard sleeve can be formed by cutting sections from a standard rigid polymer tube and forcing the tube into a precast polyurethane sleeve. Preferably, the hard sleeve is a rigid tube positioned in a mold, and the elastomeric is poured and cured around it. The need for machining either the elastomeric sleeve or the hard sleeve is eliminated, although the hard sleeve may be machined if desired.

Other aspects of the invention will be apparent to those skilled in the art in light of the following description of the preferred embodiments.

BRIEF DESCRIPTION OF THE SEVERAL VIEWS OF THE DRAWINGS

FIG. 9 is a view in end elevation, corresponding to FIG. 5, of another embodiment of bushing of the present invention.

FIG. 10 is a cross-sectional view taken along the line 10—10 of FIG. 9.

FIG. 11 is a view in side elevation of the bushing of FIGS. 9–10.

FIG. 12 is a cross-sectional view taken along the line 12—12 of FIG. 11.

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
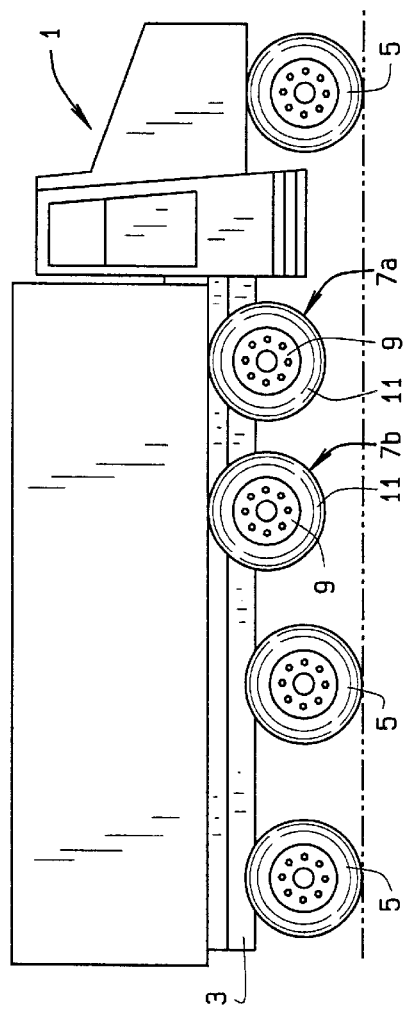
FIG. 1 is a view in side elevation of a heavy truck having lift axles in which the bushing of the present invention may be used.

Referring now to the drawings, and in particular to FIG. 1, reference numeral 1 indicates a heavy vehicle of a type for which the bushing of the present is particularly adapted, illustratively a dump truck. The vehicle 1 includes a frame 3 and wheels 5, attached to the frame through a standard suspension system. Also attached to the frame 3 are two lift axle assemblies 7a and 7b. Each lift axle assembly 7 includes at least one wheel 9, including tire 11, on each lateral side of the frame 3. The lift assemblies 7a and 7b also include a lift mechanism, not shown in FIG. 1, each of which includes, on each lateral side of the frame 3, at least one arm, an air bag for lowering the arm and supporting the arms (and axle) when the arms are lowered, a spring for raising the arm and absorbing shock when the arms are lowered, and at least one bushing in accordance with the present invention attached to each arm.

Figure 3:
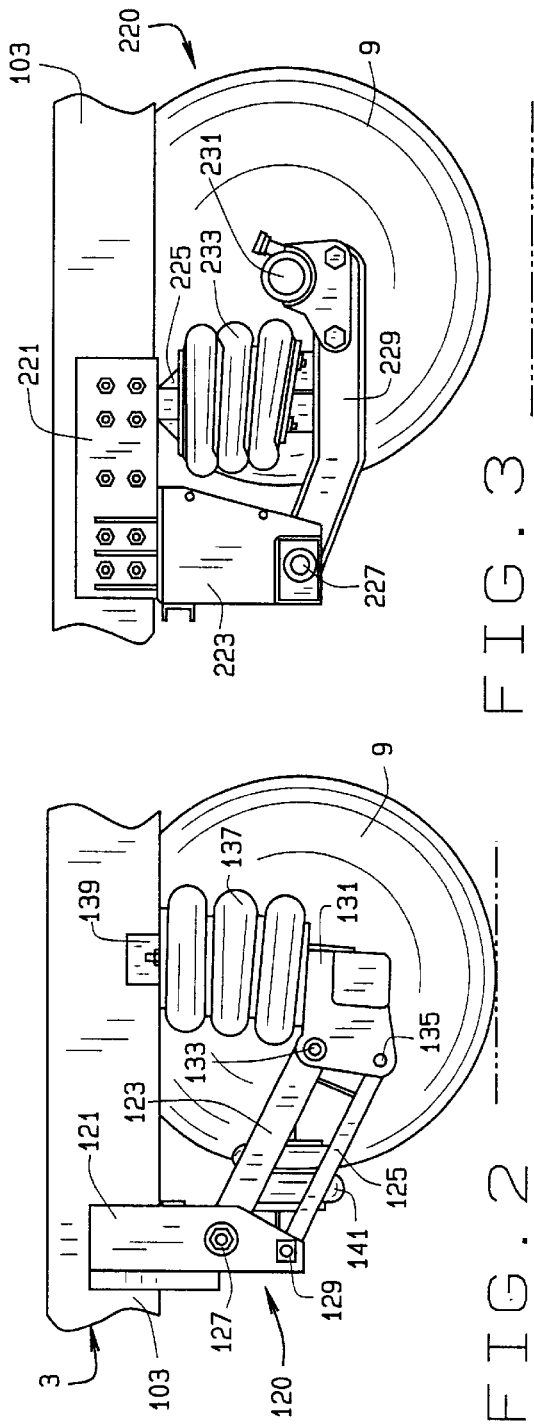
FIG. 3 is a view in side elevation of a lift axle assembly using one bushing of the present invention.
Figure 2:
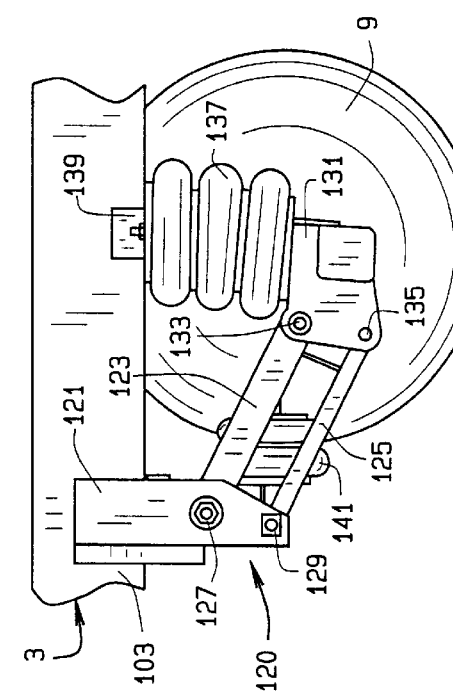
FIG. 2 is a view in side elevation of a lift axle assembly using four bushings of the present invention.

FIGS. 2 and 3 illustrate typical lift axle lift mechanisms in which the bushing of the present invention may be used.

The lift mechanism 120 of FIG. 2 is a parallelogram mechanism. It includes a first fixed depending bracket 121 attached to one of the longitudinal rails 103 of vehicle frame 3. A first arm 123 and a second arm 125 are attached to the first bracket 121 by pivots 127 and 129, respectively. The free ends of the arms 123 and 125 are connected to a moveable bracket 131 by pivots 133 and 135, respectively. The moveable bracket 131 carries one end of the axle for the wheel 9. A first, vertically expandable, air bag 137 is mounted between the moveable bracket 131 and a second fixed bracket 137 mounted to the frame rail 103. A second, horizontally expandable, air bag 141 is mounted between the first fixed bracket 121 and the first arm 123. In this arrangement, expanding the first air bag and relieving pressure in the second air bag lowers the wheel 9 into engagement with the road or other support surface. In this condition, the first air bag 137 acts as a support for the wheel 9 and its axle, while the second air bag 141 acts as a shock absorber and controls the rate of rebound of the wheel 9. Expanding the second air bag 141 and letting air out of the first air bag 137 raises the wheel 9 out of engagement with the support surface. The total travel of arms 123 and 125 about their pivots 127 and 129 between the lowered and raised positions of the wheels is about twelve degrees.

In accordance with the present invention, the pivots 127, 129, 133, and 135 are all composite bushings 301 or 401 of the present invention.

A second common form of lift mechanism 220 is shown in FIG. 3. In this embodiment, a single bracket 221 mounted to the longitudinal rail 103 includes a first depending leg 223 and a second depending leg 225. The first leg 223 carries a pivot 227 at its lower end. The pivot 227 connects a moveable arm 229 to the first leg 223. The arm 229 carries at its free end an axle 231 for wheel 9. An air bag 233 between the arm 229 and the second leg 225 is inflated to lower the arm 229. An air bag or leaf spring (not shown), carried by the first leg 223, raises the arm 229 when the air bag 233 is not inflated. The air bag 233 and the spring perform generally the same functions as the airbags 137 and 141, respectively, of the lift mechanism 120 of FIG. 2.

In accordance with the present invention, the pivot 227 is a composite bushing 301 or 401 of the present invention.

The foregoing lift mechanisms are well known in the art and are merely illustrative of the types of lift mechanisms of the present invention.

Figure 4:
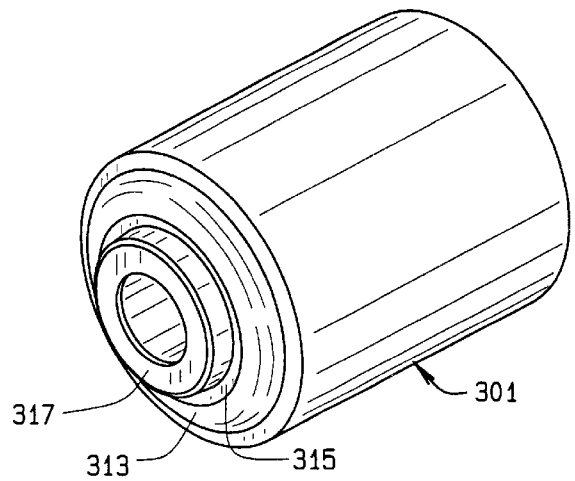
FIG. 4 is a view in perspective of one embodiment of bushing of the present invention.
Figure 5:
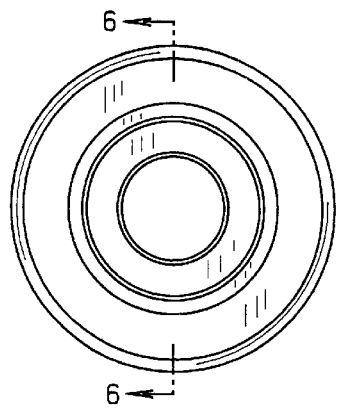
FIG. 5 is a view in end elevation of the bushing of FIG. 4.
Figure 6:
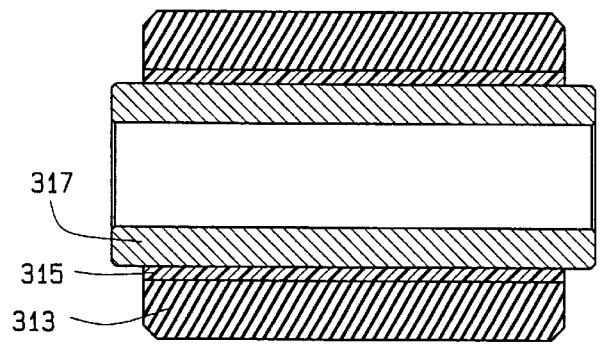
FIG. 6 is a cross-sectional view taken along the line 6—6 of FIG. 5.
Figure 7:
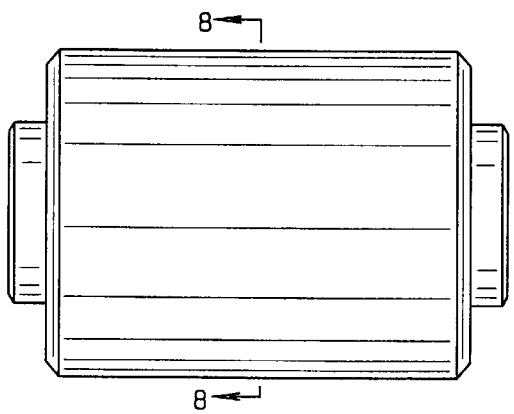
FIG. 7 is a view in side elevation of the bushing of FIGS. 4–6.
Figure 8:
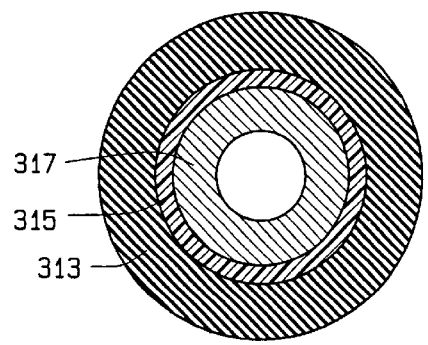
FIG. 8 is a cross-sectional view taken along the line 8—8 of FIG. 7.

In accordance with the preferred embodiments of the present invention, the pivot or pivots of the lift mechanism are formed as shown in FIGS. 4–6 or in FIGS. 7 and 8.

A first preferred embodiment of bushing 301 of the present invention is shown in FIGS. 4–6. The bushing 301 is a jam-style bushing and is formed of an outer polyurethane sleeve 313, an-inner polyethylene sleeve 315, and a steel shaft 317. The outer sleeve 313 is made of a polyurethane elastomer. The preferred elastomer is a modified diphenylmethane diisocyanate (mdi) terminated polyether prepolymer-based polyurethane having a durometer of 85A to 95A. A particularly preferred material has a tensile strength of at least 4,000 psi (ASTM D-412), a die C tear strength of at least 525 pli (ASTM D-624), a 100% modulus of over 700 psi, a 300% modulus of over 1500 psi, and an ultimate elongation in the range of 510% to 380% (ASTM412), a coefficient of friction of 0.3 to 0.5 (ASTM D-1894), a bashore resilience of 50 to 40% (ASTM 2632), a 5% compression modulus of 210 to 505 psi and a 25% compression modulus of 955 to 2370 psi (ASTM D-575), and an abrasion resistance (NBS") of 145 to 300 (ASTM D-1630), a melting point of 400 to 450° F., a continuous service temperature of 140 to 160° F., and a specific gravity of 1.09 to 1.13.

One embodiment of outer sleeve 313 is illustratively about 8.5 cm in outer diameter, about 6 cm in inner diameter, and about 12 cm long.

The inner sleeve 315 is made of ultrahigh molecular weight polyethylene. The preferred sleeve has a molecular weight of about 4,200,000, a density at 73° F. of 0.941 g/cc. (ASTM D792), a Rockwell "R" hardness of 64 R (ASTM D785), a Durometer "D" hardness of 67 D (ASTM D2240), an ultimate tensile strength at 2"/min. of 6400 psi (ASTM D638), a tensile yield strength at 2"/min. of 3400 psi (ASTM D638), a coefficient of linear thermal expansion of 9.1× .00001 in./in./F° (ASTM D696), and a relative coefficient of friction of 0.14.

The inner sleeve of this embodiment is illustratively about 6 cm in outer diameter, about 5 cm in inner diameter, and about 12 cm long. The inner and outer sleeves are adhered to each other, but are presently not bonded.

The steel shaft 317 is typically made of 1020 to 1026 steel tube meeting ASTM A512, A513, or A519. It illustratively has an outer diameter of 5 cm, an inner diameter of 2.6 cm, and a length of 13.5 cm. The shaft 317 fits snugly but easily rotatably in the inner sleeve 315, such that a force of about ten pounds is required to turn it.

The bushing 301 is manufactured as follows: A pin having the same outside diameter as the shaft 317 is rinsed in release agent. The outside of the inner sleeve 315 is optionally coated with a bonding agent. The cylindrical inside of a mold is coated with release agent. The pin and inner sleeve 315, and outer sleeve 313 are placed in a mold. Liquid uncured polyurethane is poured into the mold and allowed to pre-cure. The bushing is then removed from the mold, the mold pin is removed from the center of the bushing, and the bushing is post cured for 12–16 hours. The pour side of the polyurethane is trimmed to the correct dimensions.

It will be understood by those skilled in the art that the shaft 317 will typically be held between legs of a mounting bracket on a heavy vehicle (illustratively corresponding to the brackets 121, 131, and 227) by means of a bolt passing through the hollow shaft 317. The bolt locks the shaft to the bracket, allowing the bushing, including sleeves 313 and 315, to rotate. The outer sleeve 313 is press fitted into an eye in a moveable beam (illustratively corresponding to arms 123 and 125 or moveable arm 229). It will also be understood by those skilled in the art that the dimensions of the bushing 301 will vary widely, depending on the application.

An alternative construction of bushing 401 in accordance with the present invention is shown in FIGS. 7 and 8. As shown in these drawings, the bushing 401 includes an outer steel shell 411, an outer polyurethane sleeve 413, an inner polyethylene sleeve 415, and a steel shaft 417. The steel shell is typically made of 1020 to 1026 steel tube meeting ASTM A512, A513, or A519. It illustratively has an outer diameter of 3.125", an inner diameter of 2.875", and a length of 4.125". The remainder of the bushing 401 corresponds to the bushing 301 except in its dimensions. The outer sleeve 413 is made of polyurethane. It is illustratively about 2.875" in outer diameter, about 2.0" in inner diameter, and about 4.125" long. The inner sleeve 415 is made of ultrahigh molecular weight polyethylene. The inner sleeve is illustratively about 2.0" in outer diameter, about 1.74" in inner diameter, and about 4.125" long. The inner and outer sleeves are presently adhered to each other, but are not bonded.

The steel shaft 417 illustratively has an outer diameter of 1.735", an inner diameter of 1.006", and a length of 4.75". The shaft 417 fits snugly but easily rotatably in the inner sleeve 415, such that a force of about ten pounds is required to turn it.

The bushing 401 is manufactured as follows: A pin having the same outside diameter as the shaft 417 is rinsed in release agent. The outside of the inner sleeve 415 is optionally coated with a bonding agent. The inside of the outer shell 411 is coated with a bonding agent. The pin, inner sleeve 415, and outer shell 411 are placed in a mold. Liquid uncured polyurethane is poured into the mold between the inner sleeve 415 and outer shell 411 and allowed to pre-cure. The bushing is then removed from the mold, the mold pin is removed from the center of the bushing, and the bushing is post cured for 12–16 hours. The pour side of the polyurethane is trimmed to the correct dimensions.

Tests on a bushing having an outer shell and made in accordance with Sturmon, U.S. Pat. No. 4,840,395, and on bushings 301 and 401 have been conducted as follows, with the following results:

TABLE 1

| | Torque | | |
|---|---|---|---|
| | U.S. Pat. No. 4,840,395 | Bushing 301 | Bushing 401 |
| Free state | 75 to 245 in-lbs | <5 in-lbs | <5 in-lbs |
| Pressed into beam | | 8 to 14 in-lbs | 5 to 10 in-lbs |
| Pressed into beam under 2000 lbs load | 95 to 290 in-lbs | 10 to 18 in-lbs | 8 to 12 in-lbs |
| Pressed into beam under 5000 lbs load | 105 to 360 in-lbs | 13 to 24 in-lbs | 10 to 18 in-lbs |

As various changes could be made in the above constructions without departing from the scope of the invention, it is intended that all matter contained in the above description or shown in the accompanying drawings shall be interpreted as illustrative and not in a limiting sense. As previously noted, the dimensions, materials, and proportions of the parts will be varied to suit the application. Further, the bushings of the invention may be used in other heavy vehicle uses, particularly in those uses which require free rotation of at least about five degrees and which do not place large side or conical loads on the bushing, as for example in the lifting mechanisms of cement mixers. The preferred bushings may be used in other applications. The bushings 301 could be formed by cutting sections of the inner sleeve from a length of tubing and forcing it into a preformed elastomeric outer sleeve. Other variations, within the scope of the following claims, will be apparent to those skilled in the art in light of the foregoing disclosure.

What is claimed is:

1. A lift axle assembly for a heavy vehicle for selectively lowering and raising supplemental wheels of the vehicle into and out of engagement with a support surface, the assembly forming a part of the support system for the vehicle when the supplemental wheels are lowered, the assembly comprising at least one bushing, the bushing comprising a hard polymeric sleeve having a hardness of greater than Shore 65D, an elastomeric sleeve surrounding the hard sleeve, and a shaft rotatably mounted in the hard sleeve.

2. The assembly of claim 1 wherein the elastomeric sleeve has a Shore hardness in the range of 65A to 95A.

3. The assembly of claim 1 wherein the elastomeric sleeve is made of polyurethane.

4. The lift axle assembly of claim 1 wherein the bushing is substantially free of lubricant.

5. The assembly of claim 1 wherein the polymeric material is selected from the group consisting of polyolefin, self-lubricating acetal, polytetrafluoroethylene, polyurethane, nylon and phenolic resins.

6. The assembly of claim 1 wherein the hard polymeric sleeve, is made of an ultra-high molecular weight polyethylene having a weight average molecular weight of at least 3.1 million.

7. The assembly of claim 1 wherein the hard polymeric sleeve is fixedly mounted to the elastomeric sleeve.

8. The assembly of claim 1 wherein the hard polymeric sleeve is adhered to the elastomeric sleeve.

9. The assembly of claim 1 further comprising an air bag forming a part of the support system for the vehicle when the supplemental wheels are lowered.

10. The lift axle assembly of claim 1 wherein the bushing is a jam-style bushing consisting essentially of the elastomeric sleeve, the hard sleeve, and the shaft.

11. A heavy vehicle having a frame, a moveable arm, and a pivot connecting the moveable arm to the frame, the pivot comprising a bushing having a first part operatively attached to the frame and a second part attached to the arm, the second part being coaxial with the first part, one of the first and second parts comprising (i) a hard polymeric sleeve having a wall thickness of at least about 0.1" (0.25 cm) and a hardness of greater than Shore 65D and (ii) an elastomeric sleeve surrounding the hard polymeric sleeve, and the other of the first and second parts comprising a shaft rotatably mounted in the hard polymeric sleeve.

12. The heavy vehicle of claim 11 wherein the moveable arm comprises a second bushing having an elastomeric sleeve fixed with respect to the arm, a hard polymeric sleeve carried within the elastomeric sleeve and fixed with respect to the elastomeric sleeve, and a shaft rotatably mounted in the hard polymeric sleeve.

13. The heavy vehicle of claim 10 wherein the hard polymeric sleeve has a wall thickness of about 0.1" to about 0.5" (about 0.25–about 1.27 cm).

14. The heavy vehicle of claim 10 wherein the elastomeric sleeve has a hardness of about Shore 65A to 95A and a wall thickness of about 0.2" to about 1.0" (about 0.5–about 2.5 cm).

15. A bushing comprising a metal shaft, a hard polymeric sleeve, and an elastomeric polyurethane sleeve, the metal shaft being rotatably mounted in the hard polymeric sleeve and the hard polymeric sleeve being fixedly mounted in the elastomeric polyurethane sleeve;

the hard polymeric sleeve having a hardness of greater than about Shore 65D and a wall thickness of about 0.1" to about 0.5" (about 0.25–about 1.27 cm);

the elastomeric polyurethane sleeve having a hardness of about Shore 65A to 95A and a wall thickness of about 0.2" to about 1.0" (about 0.5–about 2.5 cm).

16. The bushing of claim 15 wherein the bushing is substantially free of lubricant.

17. The bushing of claim 15 wherein the hard polymeric sleeve is made of ultra high molecular weight polyethylene.

18. The bushing of claim 15 wherein the elastomeric polyurethane sleeve is fixedly mounted in a metal sleeve.

19. The bushing of claim 15 wherein the bushing is substantially free of lubricant.

20. The bushing of claim 15 wherein the bushing is a jam-style bushing consisting essentially of the elastomeric sleeve, the hard sleeve, and the shaft.

21. A method of forming a bushing suitable for use in a heavy duty vehicle, the method comprising a step of forming a sleeve of elastomeric polyurethane having a Shore hardness of about 65A to 95A, thereafter a step of inserting a hard polymeric sleeve into the elastomeric sleeve, and a step of inserting a shaft into the hard polymeric sleeve, the shaft being sized to be rotatable in the hard polymeric sleeve with a torque of less than fifty foot pounds.

22. The method of claim 18 wherein the hard polymeric sleeve is forced into the elastomeric sleeve without machining the elastomeric sleeve.

23. A method of forming a bushing suitable for use in a heavy duty vehicle, the method comprising a step of molding a sleeve of elastomeric polyurethane around a hard polymeric sleeve, the hard polymeric sleeve having a wall thickness of about 0.1" to about 0.5" (about 0.25–about 1.27 cm), and a step of inserting a shaft into the hard polymeric sleeve, the shaft being sized to be rotatable in the hard polymeric sleeve with a torque of less than fifty foot pounds.

24. The method of claim 23 wherein the hard polymeric sleeve is made of ultra high molecular weight polyethylene, and wherein the outer elastomeric sleeve has a hardness of about 65A to about 95A and has a wall thickness of about 0.2" to about 1.0" (about 0.5 to about 2.5 cm).

25. A lift axle assembly for a heavy vehicle for selectively lowering and raising supplemental wheels of the vehicle into and out of engagement with a support surface, the assembly forming a part of the support system for the vehicle when the supplemental wheels are lowered, the assembly comprising at least one bushing, the bushing comprising a hard polymeric sleeve, an elastomeric sleeve surrounding the hard polymeric sleeve, and a shaft rotatably mounted in the hard sleeve, the hard sleeve having a coefficient of friction less than the coefficient of friction of the elastomeric sleeve.

26. The lift axle assembly of claim 25 wherein the hard sleeve has a coefficient of friction less than half that of the elastomeric sleeve.

27. The lift axle assembly of claim 25 wherein the bushing is substantially free of lubricant.

28. The lift axle assembly of claim 25 wherein the bushing is a jam-style bushing consisting essentially of the elastomeric sleeve, the hard sleeve, and the shaft.

\* \* \* \* \*